United States Patent [19]

Stone

[11] Patent Number: 5,304,434
[45] Date of Patent: Apr. 19, 1994

[54] MODULAR CABINET FOR LARGE-SIZED SEALED LEAD-ACID CELLS

[75] Inventor: Bradley W. Stone, Elgin, Ill.

[73] Assignee: GNB Industrial Battery Co., Lombard, Ill.

[21] Appl. No.: 898,147

[22] Filed: Jun. 15, 1992

[51] Int. Cl.⁵ .............................................. H01M 2/10
[52] U.S. Cl. ..................................... 429/99; 429/100; 211/188
[58] Field of Search .......................... 429/96, 99, 100; 211/134, 188, 194

[56] References Cited

U.S. PATENT DOCUMENTS

| | | | |
|---|---|---|---|
| D. 282,794 | 3/1986 | Katsman | D6/432 |
| 1,261,652 | 4/1918 | Thorn . | |
| 1,619,476 | 3/1927 | Jones | 211/134 |
| 2,145,581 | 1/1939 | Bright . | |
| 4,065,603 | 12/1977 | Colbion | 429/99 |
| 4,270,661 | 6/1981 | Rosenband | 211/49 D |
| 4,317,497 | 3/1982 | Alt et al. | 429/99 X |
| 4,443,524 | 4/1984 | Meinhold et al. | 429/99 |
| 4,590,709 | 5/1986 | Katsman et al. | 49/396 |
| 4,994,940 | 2/1991 | Thouvenin et al. | 361/429 |
| 5,140,744 | 8/1992 | Miller | 429/100 X |

FOREIGN PATENT DOCUMENTS

1459178 11/1966 France .
4867 of 1881 United Kingdom .
2062947 5/1981 United Kingdom .

*Primary Examiner*—Stephen Kalafut
*Attorney, Agent, or Firm*—Leydig, Voit & Mayer

[57] ABSTRACT

A cell rack assembly is disclosed which is capable of storing a plurality of cells such as large size sealed lead-acid cells having one terminal on one end and the other terminal on the other end, wherein a plurality of cell-receiving modules are generally detachably attached together. Each cell-receiving module has a top plate, a bottom plate and upstanding support members connecting the top and bottom plates and defining side-by-side cell-receiving areas and a central access area therebetween. The cells are stacked with the terminals facing the end of the modules and are held in position by a set of cell covers that retain the sides of the stacked cells. The modules may be sized to accept one or more sets of stacked cells, as desired for the particular application. In its more specific embodiment, a cap assembly, a base support, and safety panels are all employed with the stacked cell-receiving modules.

17 Claims, 5 Drawing Sheets

MODULAR CABINET FOR LARGE-SIZED SEALED LEAD-ACID CELLS

BACKGROUND OF THE INVENTION

1. Field Of The Invention

This invention relates to lead-acid cells and to sealed lead-acid cells, and, more particularly, to a modular cabinet for housing such cells.

2. Description Of The Prior Art

Stationary batteries are specifically designed for float applications, that is, as standby power in the event of a power failure. Stationary batteries are usually maintained at a full-state-of-charge and in a ready-to-use condition typically by floating at a constant preset voltage. Standby batteries are used for standby or operational power in the communications field, utilities, for emergency lighting in commercial buildings and uninterruptible power supplies.

Uninterruptible power supplies are systems that back-up computers and communication networks. Sealed lead-acid cells and/or batteries may comprise the power source. The uninterruptible power source allows for the orderly shut down of computers when there is a sudden interruption in the primary electrical source, such as during a power outage and provides back-up power for communications networks. The uninterruptible power supply also will accommodate short, or intermittent, losses in power. When there is a power interruption, the batteries in the uninterruptible power system can be subject to rapid discharge.

The sealed lead-acid stationary cells and/or batteries used for industrial applications where the power requirements are high and quite demanding are typically comprised of from several to a large number of individual sealed lead-acid cells connected to one another to form a battery with the desired capacity and power requirements. The individual sealed lead-acid cells may be connected in series, in parallel or in suitable combinations of series and parallel to form a battery with the desired capacity and power requirements. External connections are typically made between the negative and positive terminal posts of the respective cells.

For many applications, the lead-acid cells used must be capable of delivering the necessary electrical power at a high rate. Thus, for example, high rate applications may involve discharging the lead-acid cells to an eighty percent depth of discharge in a period of time of from about 1 to 15 minutes or so.

Such applications may require utilizing, for example, anywhere from about 180 to 240 cells or so. At perhaps the other end of the application range, many situations require from about 24 to 48 cells or so.

The weight of lead-acid cells used for such high rate applications can vary considerably. However, each individual cell may, for example, weigh from about 30 to 60 pounds or more.

Because of space considerations, these large capacity cells need to be placed on racks, cabinets or the like in an attempt to minimize the space requirements. Height limitations in some locations also present a problem for providing racks for the number of cells required, given the available floor space. A complicating factor is that, due to the weight of the cells, the cell rack or cabinet must be extremely sturdy in construction and stable in use. Still further, for Zone 4 applications, i.e., locations where high seismic conditions can occur, there are even further stringent requirements that must be met to insure that the cells are adequately secured in the racks should such high seismic conditions occur.

Flexibility is also required because the specific applications require many different configurations. Also, when configured in a particular application, all of the cells must be easily accessible for testing, replacement when necessary, and for other maintenance and/or checking purposes.

A particularly useful cell for uninterruptible power supply applications is disclosed in the pending Shaffer et al. application, Ser. No. 07/803,349, filed Dec. 4, 1991, for: "Novel Sealed Lead-Acid Cell Having A Novel Lug, And End Cover Assembly" now U.S. Pat. No. 4,227,266. The unique cells disclosed have numerous significant advantages, including providing a battery having increased capacity and more efficient utilization of the internal space within the cell.

The lead-acid cell racks available, however, do not even adequately meet the objectives for current lead-acid cells, much less the unique cells described in the copending Shaffer et al. application.

It is accordingly a principal object of the present invention to provide a modular cell rack assembly capable of housing cells used for standby applications such as uninterruptible power supply applications.

A further object is to provide a modular cell rack assembly which minimizes the floor space requirements for the number of cells involved for a particular application.

Another object of the present invention lies in the provision of a modular cell rack assembly which is inexpensive, may be readily manufactured, and is easy to utilize in the field.

Yet another object of the present invention provides a modular cell rack assembly in which each cell retained in the assembly is readily accessible.

A still further object is to provide a modular cell rack assembly that is safe in use, essentially eliminating the possibility that terminal-to-terminal contact with metal could occur, resulting in a shock or the like to personnel handling the cells.

Yet another object lies in the provision of a modular cell rack assembly in which the cells are securely held so as to satisfy requirements for high seismic locations.

These and other objects and advantages of the present invention will be apparent from the following description and drawings.

SUMMARY OF THE INVENTION

In accordance with the present invention, there is provided a modular cell rack assembly including a plurality of cell-receiving modules. Each module includes a module top plate, a module bottom plate and upstanding support members positioned adjacent the corners of the module cover and base. In addition, upstanding support members are positioned intermediate the ends of the top and bottom plates, defining between such intermediate or central support members a central access area. So as to simplify inventory control, the top and bottom plates are preferably identical in construction. Each includes apertures to which either termination means or terminal plate mounting brackets or the like may be attached as well as allowing the cell module to be connected to another similar module. The cells are held in position by cell receptacle covers that are affixed to the upstanding support members on each side of the cell rack assembly. The cell covers may be sized to hold a plurality of cells stacked one on top of the other.

The size of the modules may be varied to accommodate the number of cells desired so that the connections electrically connecting the respective modules together are all located on the outside of the cell. This facilitates assembly in the field.

When connected together, the cell modules may be readily moved from one location to another. Obviously, because of the weight involved, a forklift truck or the like is required since the overall weight can be several hundred pounds or more, even up to about 4,000 pounds or so.

The cell rack assembly may be mounted onto a suitable base support which can be, if desired, attached to the floor or the like. The module base support has suitable apertures positioned and dimensioned for this purpose.

Pursuant to yet another aspect of the present invention, not only is access provided to the individual cells, but the central access area in the module can readily include safety means to prevent undesired terminal-to-terminal contact with metal when testing for voltage and the like.

Still further, decorative, safety panels and covers may be provided, if desired. This allows the cell rack assembly to be not only attractive, but allows ready access to the individual cells when required for service, maintenance, testing and the like.

DETAILED DESCRIPTION OF THE INVENTION

Figure 1:
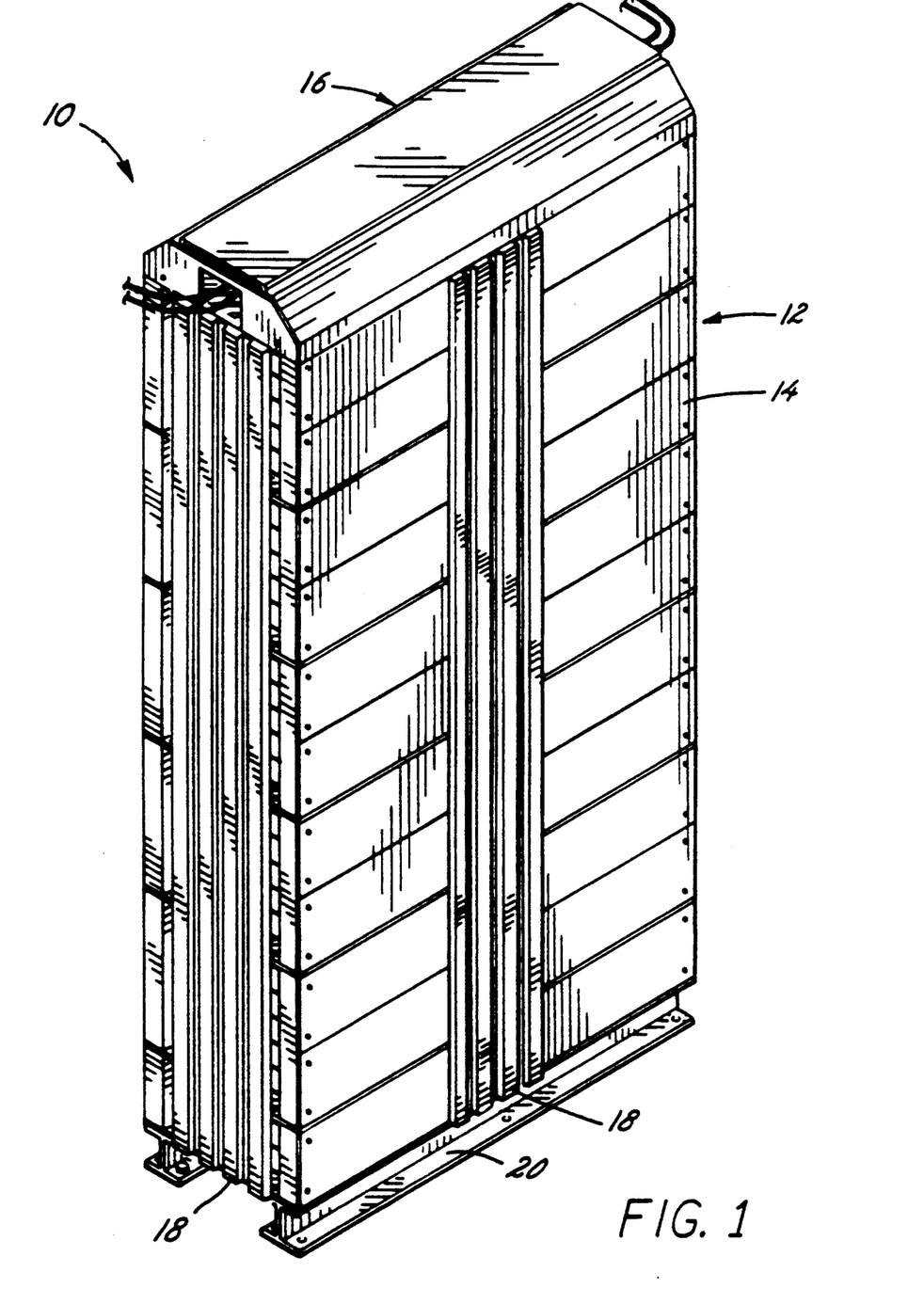
FIG. 1 is a perspective view of a preferred embodiment of the cell rack assembly of the present invention.

FIG. 1 illustrates a preferred embodiment of the cell rack assembly 10 of the present invention. The cell rack assembly 10 in the illustrative embodiment includes a series of cell-receiving modules shown generally at 12, cell covers 14 for holding the cells in position, a cap assembly shown generally at 16, and safety panels 18. The cell rack assembly 10 may be bolted to a base support shown generally at 20, which base support may in turn be bolted or otherwise attached to the floor.

By appropriate selection of the number and size of cells and the module size, the module-to-module connections can be made all on the outside of the cell rack assembly. Thus, as is shown, the module-to-module connections shown generally at 22 in FIG. 2 are all on the outside.

Figure 2:
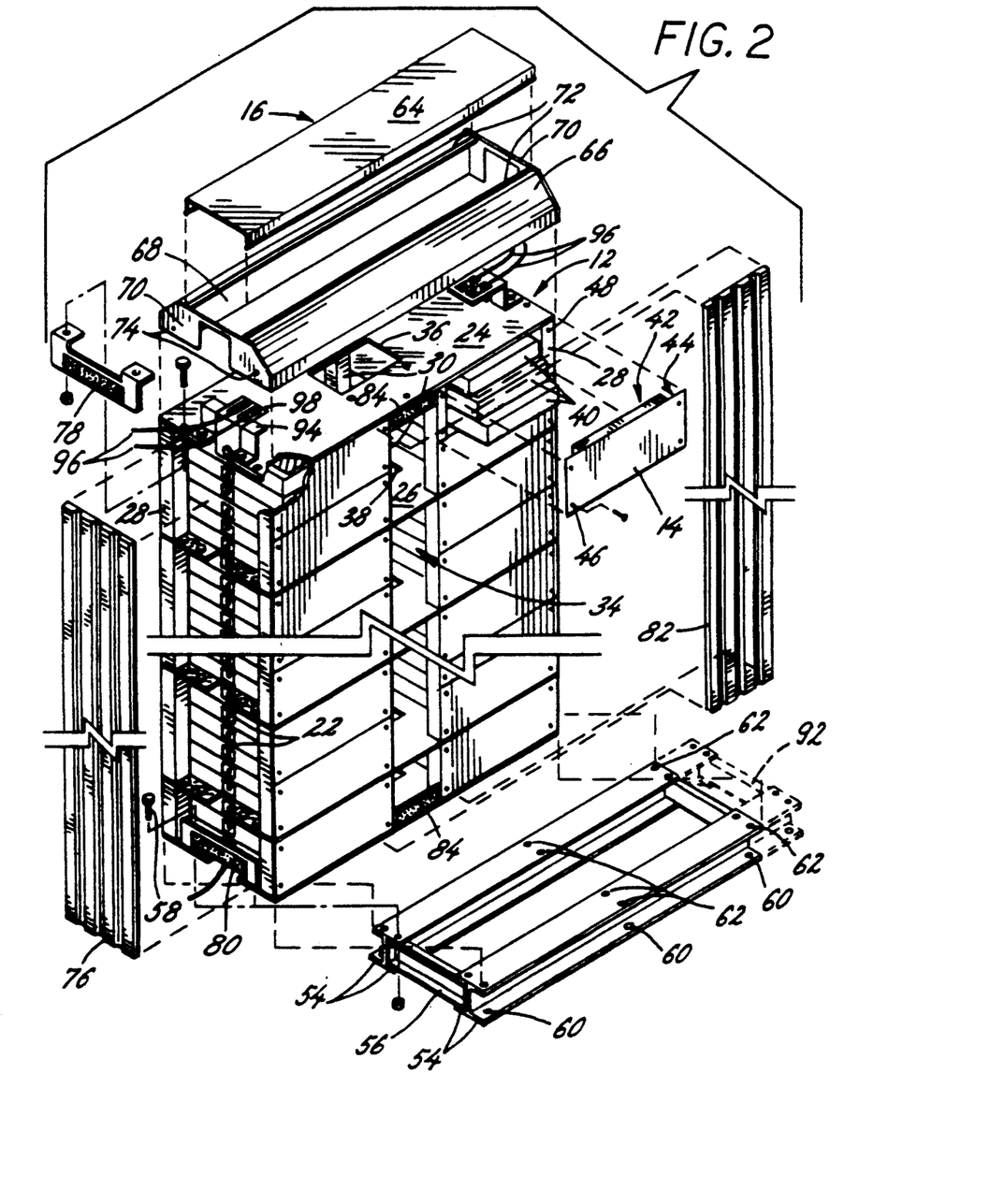
FIG. 2 is an exploded perspective view and shows in more detail the components of the cell rack assembly of FIG. 1.
Figure 4:
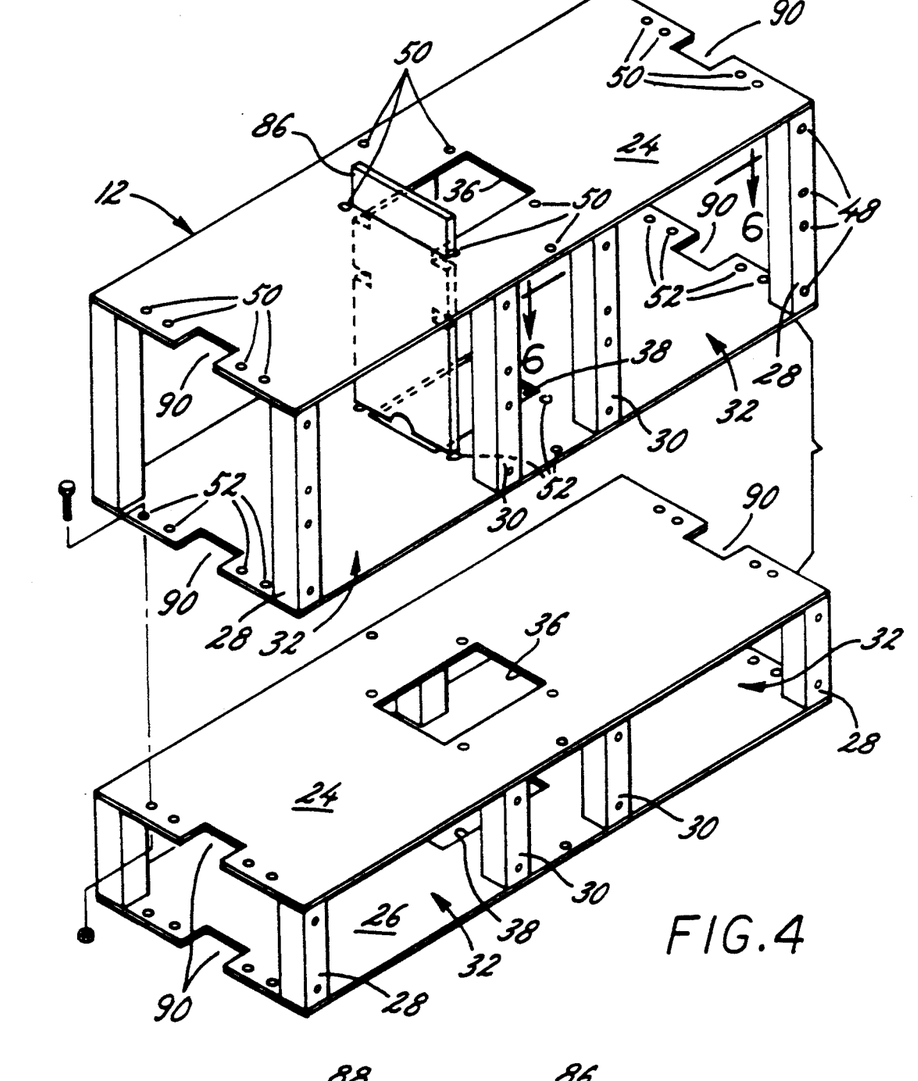
FIG. 4 is an exploded perspective view and shows how two cell modules may be attached together.

As best shown in FIGS. 2 and 4, each cell module 12 includes a top plate 24 and a bottom plate 26, both of which are identical in the illustrative embodiment, corner support members 28, and central support members 30. As was the case with the top and bottom plates, the corner and central support members can be identical in construction so as to simplify inventory control. If inventory simplification is not an issue, these components, of course, need not be identical. The corner and central support members 28 and 30 define therebetween a pair of cell-receiving areas 32 and a central access area shown generally at 34. In accordance with one aspect of this invention, access to the central access area 34 may be achieved from either side or, in the illustrative embodiment, through the openings 36 and 38 in the top plate 24 and bottom plate 26, respectively. Accordingly, ready access is provided to the terminals of the cells which face the interior of central access area 34. Accordingly, when checking for the voltage or for any other reason, access to that terminal side is relatively straightforward.

Pursuant to another aspect of the present invention, cell retention means are provided to securely hold the cells in place. To this end, as best shown in FIG. 2, the sides of the cells 40 are secured in cell covers 14. Each cell cover 14 comprises a cell retention area shown generally at 42 and an attachment area 44 for mounting on the cell module 12. In the illustrative embodiment, attachment area 44 of the cell cover 14 includes holes 46 (FIG. 2) aligning with holes 48 (FIG. 4) in support members 28 and 30 which may be attached together by bolts, as is shown in FIGS. 1 and 2.

Any means of attaching the cell covers 14 to the cell module 12 may be utilized, and a number are known. The principal requirement is that the attachment be strong enough to securely hold the cell covers in place when loaded with the cells and in the case of a seismic event. It will, of course, be generally desirable to use attachment means such as bolts that are readily able to be detached, to facilitate maintenance, replacement of a cell and the like. However, if desired, rivets or the like could be utilized as well.

As is apparent, it is the cell covers that retain the stacked cells in the desired position. The depth of the cell retention area 42 can be varied as is necessary to satisfactorily hold the cells in position. It has been, however, found adequate to maintain a depth of about one-half to one inch or so.

The end wall dimension of the cell retention area 42 depends upon the height profile of the cells being retained. In the illustrative embodiment, the cell covers 14 are sized to provide an area that retains three cells. Given the weight of the individual cells, it will generally be preferred to house no more than three cells in a single cell cover. However, if desired for the particular application, fewer or more cells can be retained.

As may be appreciated, the cell rack assembly of the present invention is designed to be utilized with cells having terminals, one positioned on one end wall and the other on the other end wall, as in the hereinbefore-identified co-pending Shaffer et al. application. Commercially available cells of this type have a height of about 2.29 inches, an end wall width of about 16.35 inches and a length that varies from about 10.22 to 14.99 inches. However, as may be appreciated, the present invention may be used for housing other cells or batteries of a similar general configuration (i.e., having terminals positioned on the opposing end walls).

Another aspect of this invention provides multi-functional attachment means for assembly in module-to-module attachment. To this end, and as shown in FIG. 4, apertures 50 in the top plate 24 and apertures 52 in base plate 26 may be used for various purposes. Thus, these apertures can allow the cell module 12 to be bolted to another module. Further, to allow transporting of a module from one location to another, these apertures can be used to attach a lifting strap or the like to the module. In addition, the top plate apertures 50 can be dimensioned and positioned to allow a terminal plate support bracket to be mounted upon, and attached to, a cell module. Base plate apertures 52 likewise permit, when desired, mounting of the cell module stack on base support 20, as well as attachment thereto. Attachment of the stacked cell modules 12 to base support 20 can be achieved by any means desired. Bolts have been found to be a satisfactory approach.

Any means of attaching one module to another may be employed. It has been found suitable to utilize bolts as these are both inexpensive and provide adequate strength. However, any suitable attachment means, detachable after assembly or not, can be used as desired.

Through the modular system of the present invention, as may be appreciated, groups of cells can be assembled in any configuration desired, in effect, by using modules designed to retain the desired number of cells. In addition, and as was alluded to earlier, appropriate selection of the number of cells retained will allow the necessary module-to-module electrical connections to be on the outside of the assembly to simplify installation in the field. In the illustrative embodiment, as is best shown in FIG. 2, this is achieved by having the bottom cell module with two three-cell stacks while each of the other modules contain two six-cell stacks. Additionally, it is preferred to utilize two sets of cell covers 14 when the modules 12 are sized to accommodate more than three cells in each cell-receiving area 32. While not this insures that the cells will not have undue weight resting on them so as to cause damage, deformation or the like.

Figure 3:
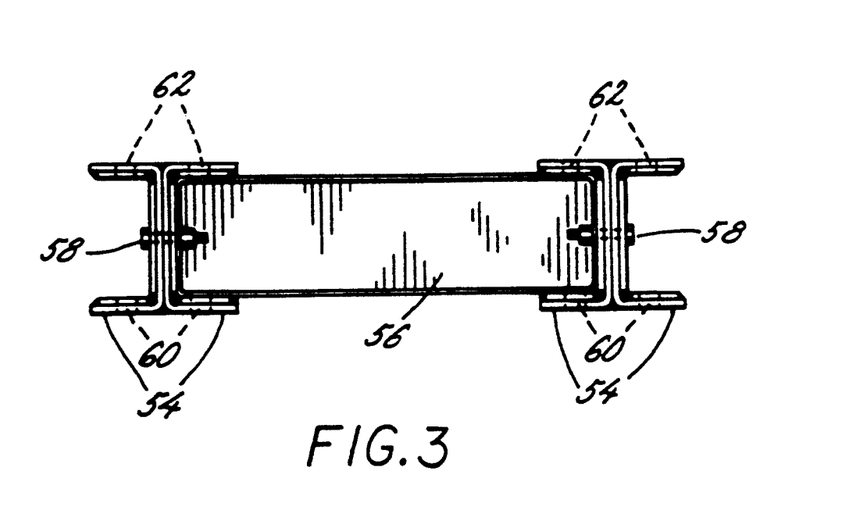
FIG. 3 is a front elevation view and illustrates in more detail the base support upon which the cell rack assembly can be mounted.

To satisfy appropriate electrical codes and the like, and to ensure stability under high seismic conditions, suitable base mounting means are provided. To this end, and as is best shown in FIG. 3, base support 20 comprises reinforcing fabricated steel C-shaped members 54 welded together to form a fabricated I-beam with a connection member 56 bolted together as is shown generally at 58. Suitable apertures or the like as is shown at 60 may be used to attach, as by bolts, base support 20 to the floor. Apertures 62 allow the stacked cell modules to be attached to the modules as by bolting the bottom plate 26 thereto via apertures 52. This construction is sturdy, relatively economical to assemble and is adequate to provide the strength required for seismic applications.

To provide aesthetics and to minimize access from the top of the cell rack assembly, a cap assembly may be utilized. Thus, as is shown in FIG. 2, the cap assembly 16 includes a top plate 64, a front panel 66, a back panel 68 and two side panels 70. Top plate 64 fits snugly into channel 72, in the front and back panels. The two side panels are attached to the ends of the front and back panels, and the cap assembly may be bolted or otherwise attached to the top cell module, via apertures 74.

If desired, safety panels may also be utilized to restrict inadvertent access and enhance the aesthetics of the assembly. Any suitable means may be used to mount the safety panels. It will be generally desired to allow such panels to be readily removed when access is needed for maintenance, testing and the like.

It has been found suitable to attach the safety panels using VELCRO ® strips. As shown in FIG. 2, the side safety panels 18 are attached to the module stack with VELCRO ® strips 78 bolted to a top plate 24 and a strip 80 bolted to a bottom plate 26. Similarly, access closure panels 18 cover the central access area 34, being attached via VELCRO ® strips 84.

The safety panels can be made of any material desired. It is preferred to use an insulating, flame retardant material and it has been found suitable to employ a v-o rated and 28% LOI polyvinyl chloride.

Figure 5:
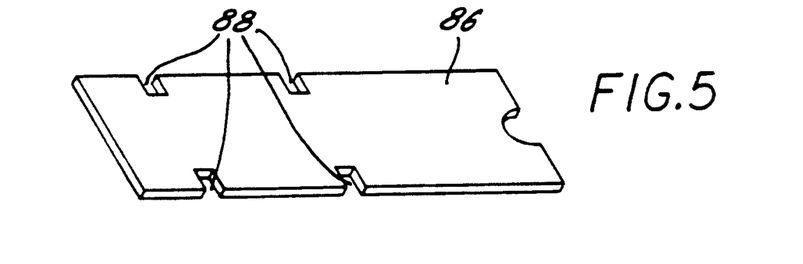
FIG. 5 is a perspective view of the safety adapter shown in FIG. 4 and showing more detail.

Pursuant to another feature of this invention, there is provided a safety adapter which eliminates inadvertent contact with opposing cell terminals when the cells are being inspected through the central access area 34. To this end, and as is shown in FIGS. 4 and 5, a safety adapter shown generally at 86 is provided. The safety adapter 86 can comprise a plastic or other non-conducting material having grooves shown generally at 88 which allow the safety adapter to be moved from one side of central access opening 34 to the other. In the illustrative embodiment, two grooves are shown to allow one safety adapter to fit modules of two different sizes. In this fashion, inventory control is simplified.

Thus, when the terminals of the cells contained in one cell-receiving area 32 are being inspected, the safety protector can be moved adjacent to the cells contained in the other cell-receiving area. In this fashion, when a voltage meter or the like is inserted into central access area 34, there is no possibility that terminal-to-terminal contact will occur.

Figure 6:
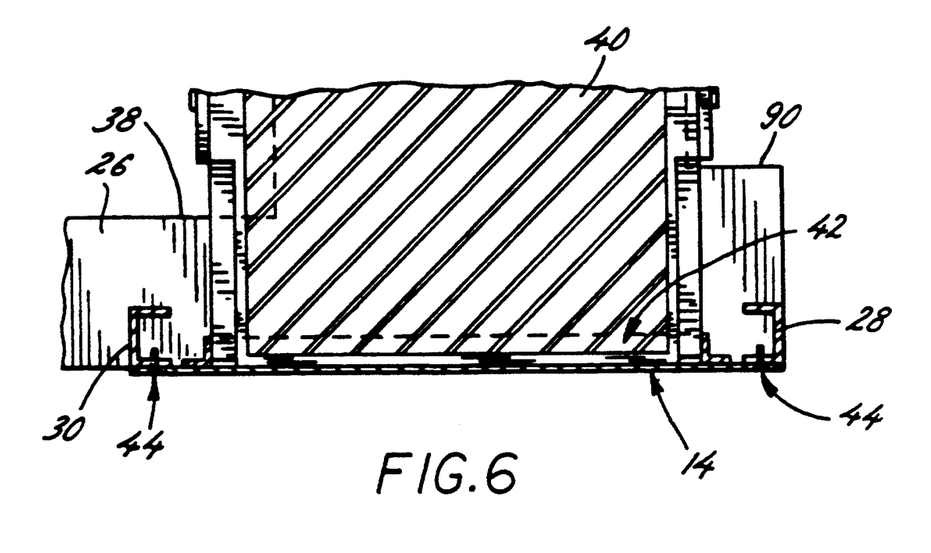
FIG. 6 is a cross-sectional view taken generally along lines 6—6 of FIG. 4 and showing the positioning of a cell in the module.

Yet another feature of this invention provides dimensioning the components of the rack assembly such that short circuiting of any cell cannot occur during installation, operation, or removal of a cell from the rack assembly. This serves as an additional safety feature that eliminates the possibility of electrical shocks and the like. To this end, and as is shown in FIG. 6, the cell cover 14 terminates short of corner and intermediate support members 28 and 30. Accordingly, when the cells 40 are removed for replacement or the like, the cell terminals cannot both contact a metal member, no matter how the cells are manipulated in and out of the rack assembly.

A further safety feature of the present invention comprises appropriately configuring the cell-receiving module so as to safely position the top and bottom plates from the cell terminals. To this end, and as can be seen from FIG. 4, the top and base plates each have cut-outs indicated generally at 90. The cut-outs 90 surround the area where the cell terminals are located (FIG. 2) and, as well, allow the necessary electrical connections to be readily made from module-to-module.

Yet another safety feature involves a subtle, but effective, alteration to the base support employed. More specifically, by altering the size of the base support, the manufacturer can insure that adjacent cell rack assemblies are suitably positioned one from the other so as to eliminate the possibility of inadvertent terminal-to-terminal contact and to provide an adequate access area. To this end, as is shown in FIG. 2, the base support 20 can be made wider as shown in phantom at 92. By alternating the base supports employed, it can be insured that adjacent cell rack assemblies are suitably spaced one from the other. It has been found suitable to lengthen the base support by about six inches to accomplish the desired spacing.

Termination from the cell rack assembly can be provided as is desired. In the embodiment illustrated (FIG. 2), positive and negative terminal plate mounting brackets 94 are mounted on top plate 24, and cables 96 are connected to terminal plate 98.

The cell-receiving modules described in the embodiment shown in FIGS. 1-6 will be generally preferred. Thus, most applications will require a sufficient number of cells that, what may be termed for convenience, a dual module will be more efficient. However, there are some applications requiring such a relatively small number of cells that a dual module is not required.

Figure 7:
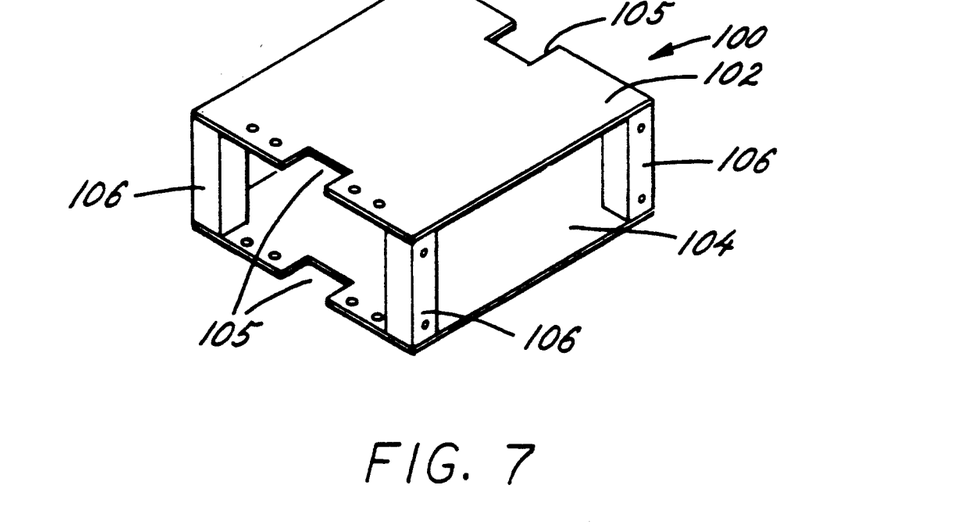
FIG. 7 is a perspective view and illustrating an alternative cell-receiving module used where only a relatively small number of cells is required for the application.

It is accordingly within the scope of the present invention to utilize a single module. To this end, and as is shown in FIG. 7, single module 100 is one-half of the dual module. The single module 100 thus includes a top plate 102 and a bottom plate 104 having cut-outs 105 for the cell terminals, and upstanding corner support members 106. The cell covers and the means for attachment can be configured as in the FIG. 1-6 embodiment. A suitable cover, safety side panels and base support can likewise be the same configuration as illustrated in FIG. 2, suitably dimensioned, of course, to fit the size of the single module.

Figure 8:
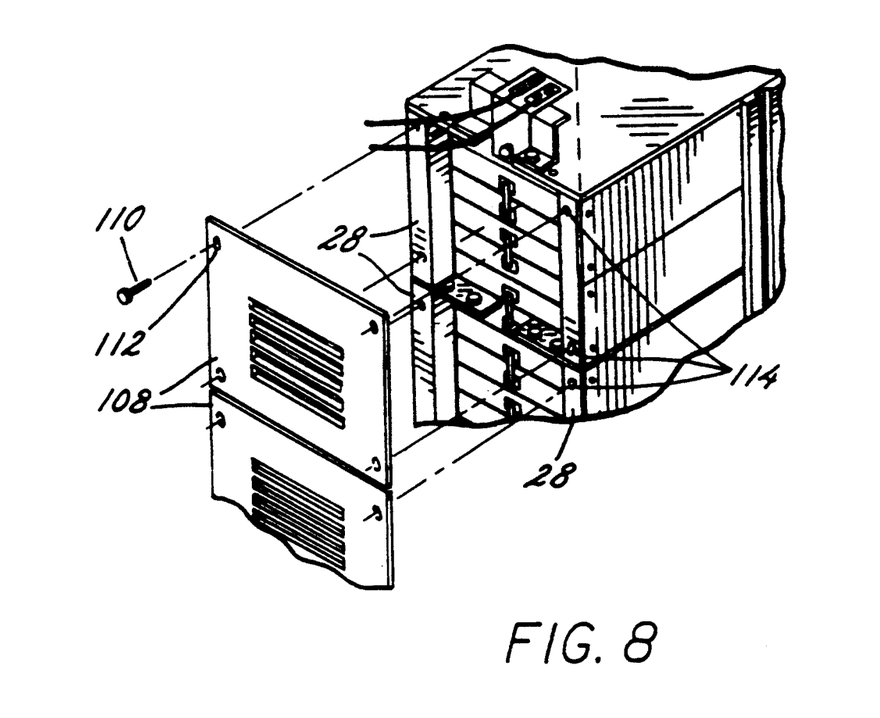
FIG. 8 is a fragmentary exploded perspective view of a module and showing a shear panel employed for Zone 4 applications.

Another aspect of this invention involves side shear panels which may be attached to the modules to increase their structural integrity and to satisfy requirements for Zone 4 applications. To this end, FIG. 8 shows a side shear panel 108 that may be attached to corner support members 28 with bolts 110. Holes 112 in shear panel 108 can be provided to align with holes 114 in corner support members 28 for attaching the shear panel 108 to the module by bolts or other attachment means.

The materials utilized for the cell rack assembly of the present invention can be any material desired, consistent with the objectives and requirements for the particular components. Suitable illustrative materials are sheet steel, sheet metal, aluminum, fiberglass, plastics, and structural steel.

Thus, as has been seen, the modular cell rack assembly of the present invention provides a system that utilizes relatively inexpensive components which may be easily manufactured and assembled. A minimum number of components is required; yet, because of the modular configuration, widely varying applications can be satisfied. In use, the cell rack assembly of the present invention has a relatively small footprint as regards floor space in comparison to other arrangements used for similar applications. The cell rack assembly of this invention can be readily installed, and ready and easy access can be provided when required for maintenance, testing and replacement of cells.

I claim:

1. A cell-receiving module for a cell rack assembly capable of housing a plurality of cells having one terminal on one end and the other terminal on the other end, said cell-receiving module having a top plate, a bottom plate, and upstanding support members connecting said top and said bottom plates and defining side-by-side cell-receiving areas and a central access area between said cell-receiving areas, a set of cell covers each having a cell-retaining area capable of accepting part of a plurality of cells and retaining the cells in position and an attachment area for mounting said cell covers on said upstanding support members, each cell-receiving area being sized to accept at least one set of said cell covers, and at least one of said top and bottom plates having means for attaching said module to another.

2. The cell-receiving module of claim 1, wherein said top and bottom plates each have an opening allowing access to said central access area.

3. The cell-receiving module of claim 2, wherein the sides of the module adjacent said central access area are open.

4. The cell-receiving module of claim 1, wherein both said top and bottom plates include means for attaching said module to another module.

5. The cell-receiving module of claim 4, wherein said means for attaching one module to another comprises a series of apertures for bolts.

6. The cell-receiving module of claim 5, wherein said apertures are positioned and dimensioned for accommodating a lifting strap.

7. The cell-receiving module of claim 1, wherein said top and bottom plates each have a recessed portion located at the area where the cell terminal is located when the cells are stacked within the module.

8. The cell-receiving module of claim 1, which includes a safety adapter capable of sliding within the central access area.

9. A cell rack assembly capable of housing a plurality of cells having one terminal on one end and the other on the other end of the cell, comprising a plurality of cell-receiving modules attached together and having a top and bottom module, each of said cell-receiving modules having a top plate, a bottom plate and upstanding support members connecting said top and bottom plates and defining side-by-side cell-receiving areas having an outside and an inside dimension, and a central access area between said cell-receiving area, a set of cell covers each having a cell-retaining area capable of accepting part of a plurality of cells and retaining the cells in position and an attachment area, a plurality of cells stacked within each cell-receiving area, said attachment areas of said cell covers being mounted on the sides of said module on said upstanding support members and enclosing within the cell-retaining area the sides of the stacked cells, each cell-receiving area being sized to accept at least one set of said cell covers.

10. The cell-receiving module of claim 9, wherein the cells are electrically connected together.

11. The cell-receiving module of claim 10, wherein the cells are connected in series.

12. The cell-receiving module of claim 11, wherein each module-to-module connection is on the outside dimension of the cell-receiving area.

13. The cell-receiving module of claim 11, wherein said top and bottom plates each have a recessed portion dimensioned to position the cell terminal facing the outside dimension of the cell-receiving area within the recessed area.

14. The cell-receiving module of claim 13, wherein said top and bottom plates each have an aperture allowing access to the central access area and the terminal of the cells adjacent the inside dimension of the cell-receiving area being disposed within the aperture.

15. The cell-receiving module of claim 11, which includes a base support attached to the bottom cell-receiving module and upon which the plurality of modules are positioned.

16. A cell-rack assembly capable of housing a plurality of cells having one terminal on one end and the other on the other end of the cell, comprising a plurality of cell-receiving modules stacked one upon another including a top module and a bottom module, each module being attached to the adjacent module, each of said cell-receiving modules having a top plate, a bottom plate and upstanding support members connecting said top and bottom plates and defining said-by-side cell-receiving area having an outside and an inside dimension and a central access area positioned between such cell-receiving area, a set of cell covers each having a cell-retaining area capable of accepting part of a plurality of cells and retaining the cells in position and an attachment area for mounting said cell cover on said upstanding support members, a plurality of cells tacked one on top of the other in the cell-receiving areas and a set of cell covers being detachably mounted upon said upstanding support members, each cell-receiving area having at least one set of said cell tray covers mounted thereon, the cells being electrically connected together, a cap assembly attached to the top module, the central access area and the outside dimension of the cell-receiving areas of each module being open, safety panels detachably attached and covering the respective central access area and the outside dimension of the modules, and a base support attached to the bottom module.

17. A cell-receiving module for a cell rack assembly capable of housing a plurality of cells, said cell-receiving module having a top plate, a bottom plate and upstanding support members defining a cell-receiving area, and a set of cell covers each having a cell-retaining area capable of accepting part of a plurality of cells and retaining the cells in position and an attachment area for mounting said cell covers on said upstanding support members, the cell-receiving area being sized to accept at least one set of said cell covers and at least one of said top and bottom plates having means for attaching said module to another.

* * * * *

UNITED STATES PATENT AND TRADEMARK OFFICE
CERTIFICATE OF CORRECTION

PATENT NO. : 5,304,434
DATED : April 19, 1994
INVENTOR(S) : Bradley W. Stone

It is certified that error appears in the above-indentified patent and that said Letters Patent is hereby corrected as shown below:

On the Title page, item [56], under References Cited, 4,065,603  12/1977, delete "Colbion" and substitute therefor --Coibion--.
Column 5, line 41, after "not" insert --essential--.
Column 8, line 38, the second occurrence of the word "area" add a "s" to the end--;
Column 8, lines 48, 50, 52, 55, 60 and 65, delete "cell-receiving module" and substitute therefor --cell-rack assembly --;
Column 9, line 10, the word "area" add a "s" to the end; and
Column 9, line 15, delete "tacked" and substitute therefor -- stacked--.

Signed and Sealed this

Twentieth Day of September, 1994

Attest:

BRUCE LEHMAN

Attesting Officer

Commissioner of Patents and Trademarks